Sept. 15, 1953

G. A. TINNERMAN 2,652,275

CLOSURE FASTENER

Filed Jan. 31, 1949

Inventor
GEORGE A. TINNERMAN

By H. G. Lombard
ATTORNEY

Sept. 15, 1953     G. A. TINNERMAN     2,652,275
CLOSURE FASTENER
Filed Jan. 31, 1949     3 Sheets-Sheet 2
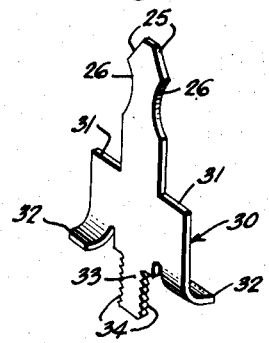
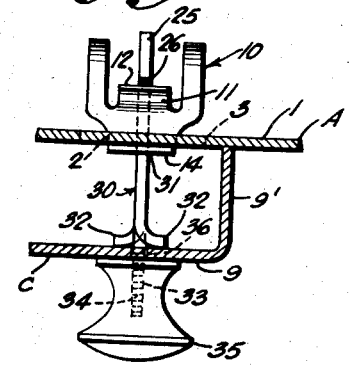
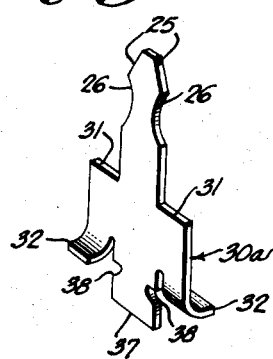
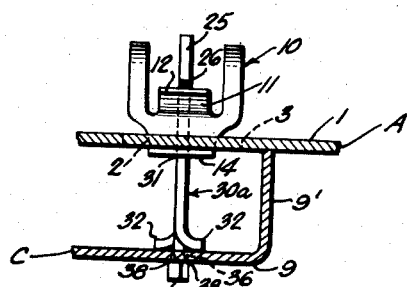
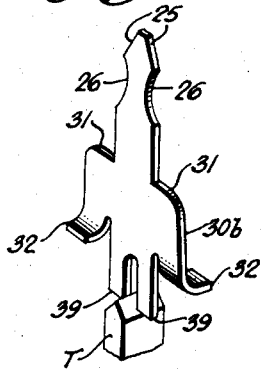
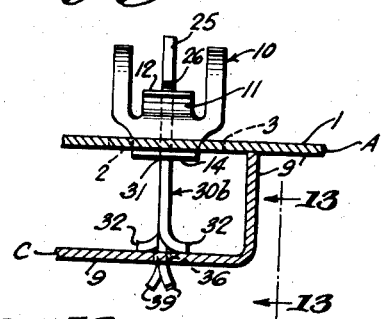
Inventor
GEORGE A. TINNERMAN
By
H. G. Lombard
ATTORNEY

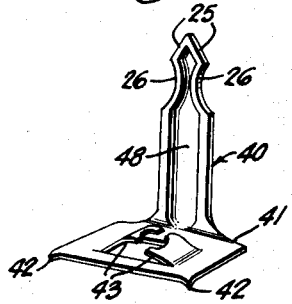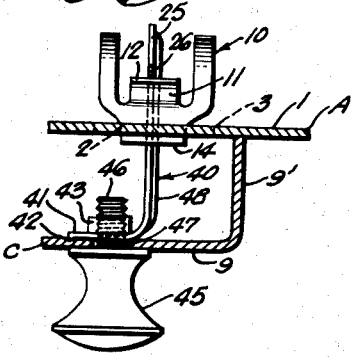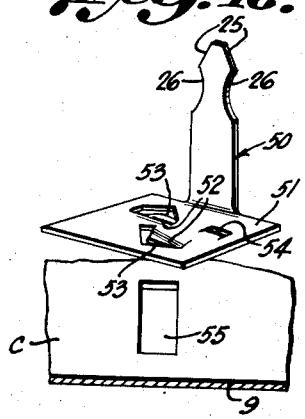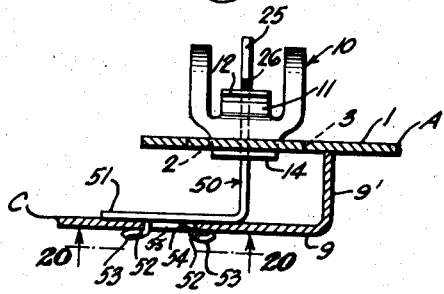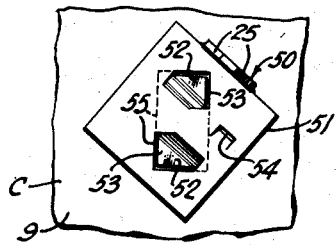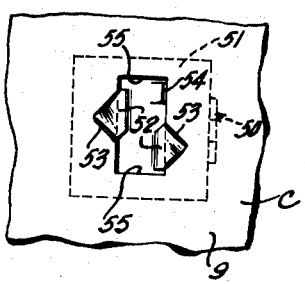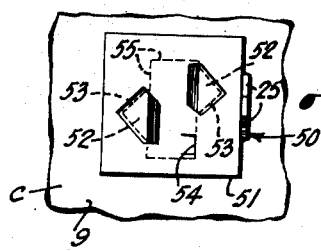

Patented Sept. 15, 1953

2,652,275

UNITED STATES PATENT OFFICE 2,652,275

CLOSURE FASTENER

George A. Tinnerman, Cleveland, Ohio, assignor to Tinnerman Products, Inc., Cleveland, Ohio, a corporation of Ohio Application January 31, 1949, Serial No. 73,780

1 Claim. (Cl. 292—17)

This invention relates in general to closure fasteners and the like, and deals, more particularly, with an improved spring catch or spring clip device and various forms of cooperating studs which are used therewith as the latching or separable fastening means for doors, drawers, and similar swinging or sliding closures of cabinets, casings, housings, etc.

The nature of most spring catch and spring latch devices is such that they usually require some form of auxiliary fastening means such as bolts, screws, rivets, or the like, to secure the same in attached position in an assembly or otherwise, require a special retainer or adapter which is secured in the assembly and in turn holds the spring catch or spring latch device in operative position. Naturally an important part of the cost of the spring latch or spring catch devices resides in the use of such auxiliary fastening means or special adapters or retainers, both in the cost of these devices and in the cost for the labor required in the time-consuming assembling operations involved.

A primary object of the invention, therefore, is to provide an improved spring catch or spring latch device which is complete in itself and is easily and quickly applied to attached operative position in an opening in a panel, flange or other part of an assembly and retained in such operative position against inadvertent disconnection or accidental removal without the use of bolts, screws, rivets or other extraneous attaching means or special adapters or retainers for this purpose.

Another object of the invention is to provide such a spring catch or spring latch which is adapted to be readily attached in a panel opening in this manner from either the forward or rearward side of the panel.

Frequently an assembly is such that the interior or inner side of the panel to which the spring catch is to be attached is enclosed or concealed by other parts of the installation and it is therefore necessary that the spring catch be capable of attachment by an assembling operation taking place entirely from outside of the panel. A further object of the invention, therefore, is to provide a spring catch or spring latch device of the kind described which is adapted to be applied easily and quickly to attached operative position in a panel opening in an assembly by an operation taking place entirely from the outer, readily accessible side of the assembly, as is required in a blind location, for example.

Another object of the invention is to provide an improved spring catch which is formed complete with attaching means from an inexpensive section of sheet metal to comprise a compact, simple form of device which, though light in weight, is extremely durable and thereby highly practical and especially adapted for use with light weight structures, especially sheet metal structures such as refrigerators, utility cabinets, stoves, ranges, and the like.

A further object of the invention is to provide an improved sheet metal spring catch or spring latch or similar fastener which is self retained in attached position and comprises a pair of resilient spring arms which extend free in face to face relation for engagement with a cooperating stud or strike mounted on a door, closure or other part in a manner whereby said resilient spring arms are forced apart to receive the stud and frictionally and grippingly engage the same in secured position.

Still another object of the invention is for the provision of a sheet metal spring catch or spring latch of this character which is provided with relatively long spring arms having cam surfaces formed on their extremities which are adapted to receive and engage cam surfaces on a cooperating stud or strike by snap fastening action and with a minimum of distortion and strain thereby minimizing the possibility of breakage of the spring arms from crystallization.

An additional object of the invention is to provide a spring catch having all the foregoing features and advantages and which is adapted for use with a cooperating sheet metal stud or strike provided as an inexpensive, one-piece sheet metal stamping.

Another object of the invention is to provide a spring catch such as described comprising a sheet metal spring fastener and a cooperating sheet metal stud or strike in various forms which are adapted for attachment in a wide range and variety of applications.

Further objects and advantages and new and useful features in the construction, arrangement and general combination of parts of the invention will be readily apparent as the following description proceeds with reference to the accompanying drawings, for purposes of illustration but not of limitation, in which like reference characters designate like parts throughout, and in which:

Fig. 3 is a view taken along line 3—3 of Fig. 2 showing the general outline of the panel opening and the relation of the spring catch in attached position in such panel opening;

Figure 4:
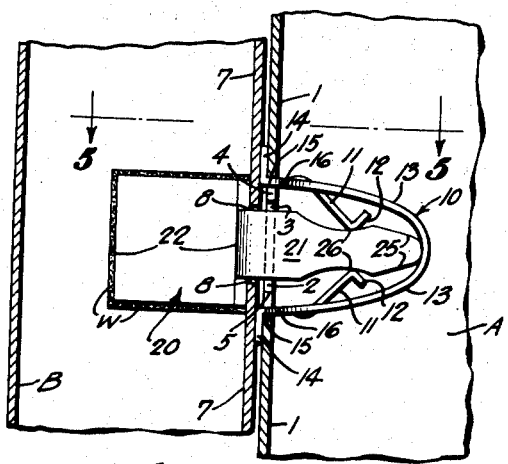
Figure 5:
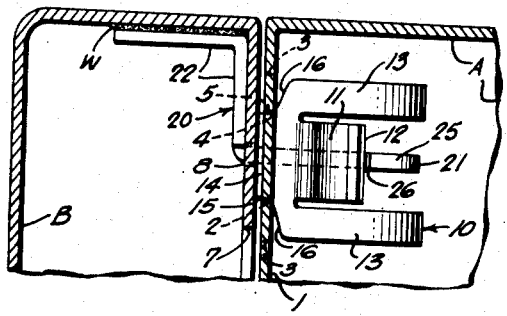
Figure 6:
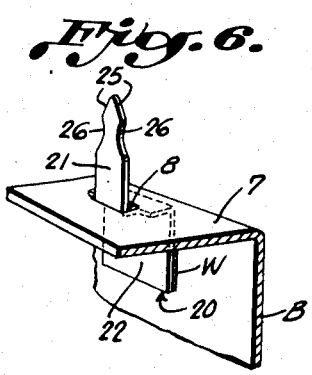

Fig. 4 is a sectional view through a pair of adjacent members of an installation showing the improved spring catch in edge elevation in attached position on one member and in securing engagement with a cooperating stud attached to the other member;

Fig. 5 is a sectional view along line 5—5 of Fig. 4, showing the spring catch in side elevation with the sheet metal stud retained thereby shown in edge elevation; and Fig. 6 is a perspective view illustrating one form of attachment of the sheet metal stud wherein the shank of the stud extends through an opening in the associated member.

Fig. 7 is a perspective view of a modified form of sheet metal stud; and

Fig. 8 is a sectional view similar to Fig. 5 showing an assembly embodying the stud of Fig. 7;

Fig. 9 is a perspective view of another form of sheet metal stud; and

Fig. 10 is a sectional view similar to Fig. 5 showing an assembly embodying the stud of Fig. 9;

Fig. 11 is a perspective view showing a further form of stud together with a portion of the tool for anchoring the stud in attached position;

Fig. 12 is a sectional view of an assembly similar to Fig. 5 showing the stud of Fig. 11 as anchored in attached position on the associated member; and Fig. 13 is a fragmentary side view of Fig. 12, as along line 13—13, showing the elements for anchoring the stud in attached position.

Fig. 14 is a perspective view of still another form of sheet metal stud; and

Fig. 15 is a sectional view of an assembly similar to Fig. 5 showing the sheet metal stud of Fig. 14 in attached position on the associated member.

Fig. 16 is a perspective view of a further form of sheet metal stud provided with clip type attaching means and shown in position for attachment in an opening in the associated panel member;

Fig. 17 shows the fastener of Fig. 16 in top plan as initially inserted and positioned in the opening in the associated panel member prior to the final attachment of the stud in said panel opening;

Fig. 18 is a view similar to Fig. 17 showing the stud in final attached position in the panel opening;

Fig. 19 is a sectional view of an assembly similar to Fig. 5 showing the stud of Figs. 16-18 inclusive as attached in an opening in the associated panel member in a completed installation;

Fig. 20 is a fragmentary bottom plan view of Fig. 19, as along line 20—20, showing the attaching elements of the sheet metal stud in final attached position in the panel opening.

The improved spring catch or spring latch of the invention is one of general utility in that it is readily adapted for a wide range and variety of applications and uses as a separable fastener for doors, drawers and similar swinging or sliding closures, or as a similar fastener for detachably securing any two or more adjacent parts of an assembly.

The spring catch is particularly advantageous in that it is provided complete in itself together with attaching means receivable in a panel opening in a part for holding the same in self-sustained operative position on the panel without the use of bolts, screws or other auxiliary fasteners or special adapters or retainers. A further advantage in this regard resides in the fact that the spring catch is readily attached in the same fastening position on the supporting panel or plate either from the rearward side of the supporting panel or from the forward side of the panel when the rearward side is not conveniently or readily accessible, as is required in a blind location, for example. The spring catch, therefore, is admirably suited for manufacture in the manner of standard designs which are usable as the securing means for practically any assembly of parts having adjacent panel or plate portions to be fastened in either separable or permanently secured relation.

The improved spring catch of the invention otherwise is advantageous in that it is suitable for use with any type of cooperating stud or strike and particularly, such studs provided in the manner of inexpensive sheet metal stampings which are readily designed for attachment to practically any type of door, panel flange, plate or other part.

Referring now, more particularly, to the drawings, the door catch or the like of the invention is shown comprising a pair of cooperating snap fastening members including a spring fastener 10 and a cooperating stud or strike 20, adapted to be mounted on a pair of opposed, abutting panel portions A, B of the usual cabinet casing and door or other closure therefor. The fastening members 10, 20, are so mounted in a completed installation that on closing of the door, they are practically concealed within the casing such that the respective panel portions may be brought into flush contact with each other to provide a uniform, substantially unbroken exterior appearance to the cabinet or other structure. A further advantage of the improved spring catch resides in the fact that the door or other closure is fully and tightly closed and under more than the usual amount of spring tension whereby looseness of the door in closed position is eliminated and squeaks, rattling and other objectionable noises are prevented. It will be understood that the cooperating fastening members 10, 20, may be mounted as desired on any pair of separable, abutting wall surfaces but where employed as a door catch, they are, of course, preferably secured adjacent the superposed free ends of the door and casing.

Figure 1:
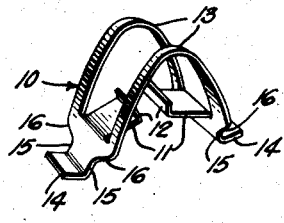
Fig. 1 is a perspective view of the improved spring catch or spring latch of the invention.
Figure 2:
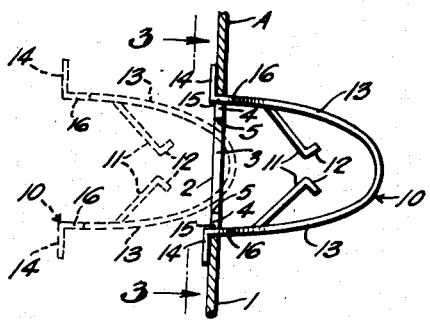
Fig. 2 is a sectional view showing the improved spring catch in edge elevation as attached in an opening in a supporting panel.
Figure 3:
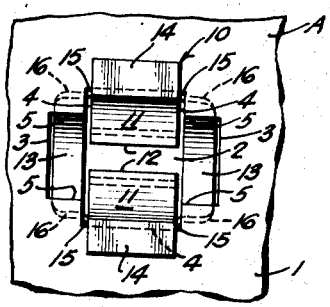

In the form of the invention shown in Figs. 1-6 inclusive, the casing or cabinet structure A, Figs. 3 and 4, is shown in the general construction which includes an inturned or inwardly extending flange or plate portion 1 bordering the open area of the cabinet or casing. A swinging or sliding door or cover B for the cabinet or casing comprises a panel member having an inturned flange 7 which is disposed in abutting relation to the flange 1 on the cabinet or casing A in closed position. The cooperating fastening devices 10, 20, accordingly, are attached to the abutting flange members 1, 7, respectively, to serve as a separable door catch or, likewise, for securing any similar pair of abutting panel members or wall members. The spring fastener 10 is attached to its supporting part comprising the inturned flange 1 on the part A through the provision of a suitable fastener receiving opening 2 in said flange 1 in which the fastener may be attached either from the rearward side of said flange by a simple clip action or from the forward side thereof by a simple snap fastening action. Such an opening 2 may be provided in various outlines and, in the present example, is shown provided as a simple cruciform type of hole provided by a pair of crossed slots comprising a longer slot 3 crossed by a shorter slot 4 and defining inwardly extending projections 5 in the outline of the hole which present abutments for retaining the fastener in attached position in said panel opening 2, as presently to be described. The cruciform type of hole shown in Fig. 3 is preferable in instances where it is necessary or desirable for the fastener to be attachable from either the inner or outer side of the panel or panel flange 1. In other instances where the fastener may be attached from the inner side of said flange, the fastener receiving opening 2 may be provided as a simple rectangular hole defined only by the shorter slot 4.

The spring clip 10 is a relatively simple article of manufacture which may be readily produced at low cost from an inexpensive section of any suitable sheet metal, preferably tempered spring steel or cold rolled steel having spring-like characteristics. The spring clip may be formed from blanks of various outlines but from the standpoint of most economical quantity production is most advantageously provided from a simple generally rectangular blank which may be obtained from standard sheet metal strip stock with little loss or waste of material. The blank or strip forming the clip is provided with a central transverse slit intermediate a pair of spaced longitudinal slits on opposite sides of the transverse slit to define a pair of elongate spring arms 11 between the side or bridge portions 13 and the ends 14 of the blank. The blank, as thus formed, is bent into an inverted V-shape in which the side portions 13 define elbows in an inverted V-shape with the spring arms 11 extending upwardly between said elbows in face to face relation and with the ends 14 of the blank bent outwardly in opposite directions to provide horizontal base portions for attaching the fastener.

The spring arms 11 are inclined inwardly toward each other in suitable spaced relation and are provided with outwardly bent lips 12 on their extremities defining curved or rounded contact surfaces which permit the head of the cooperating stud 20 to readily enter and seat therebetween on being applied thereto in one direction and to resist reverse movement thereof in an opposite direction, but capable of being withdrawn when sufficient axial force is exerted to separate the stud from the spring catch, or vice versa.

The ends of the blank are cut away at each corner to provide the base portions 14 of a width less than the full width of the blank and with the outer edges of each base portion tapering outwardly to provide outwardly inclined or bevelled cam shoulders 16. The end portions of the blank are each formed of suitable length to provide the horizontal base portion 14 and an adjoining straight neck portion 15 in generally normal relation thereto and spacing the same from the adjacent cam shoulders 16. The cam shoulders 16 are thus provided in spaced relation to the base flanges 14 in accordance with the predetermined thickness of the marginal portions of the fastener receiving opening 2 so as to snugly engage the opposite surfaces of such marginal portions in the attached position of the fastener in said opening. The arrangement, otherwise, is such that the base portions 14 and adjoining neck portions 15 are provided in a width slightly less than the width of the shorter slot portions 4 in the panel opening 2, while the maximum width of the blank is slightly less than the width of the longer slot 3. The U-shaped fastener body, accordingly, is readily adapted to pass through said longer slot 3 as the narrower base portions 14 and adjoining neck portions 15 are received in the ends of the shorter slot 4 to seat the fastener in attached position in the panel opening.

Referring to Figs. 2 and 3, it will be understood that the spring clip or fastener 10 thus provided is readily applied to attached operative position in the opening 2 by an operation taking place entirely from the outer forward side of the panel flange 1, as is required in a blind installation, for example. As illustrated by the dotted line showing of the fastener 10, in Fig. 2, the central body of the fastener is compressed from its normal untensioned V-shaped configuration as necessary to be inserted in the longer slot portions 3 of the said opening 2. When the fastener is pushed home to the fully attached position thereof in said opening, as shown by full lines in Fig. 2, the cam shoulders 16 pass through the panel opening and thereupon spring outwardly into engagement with the projections or abutments 5, Fig. 3, of the opening at the rearward side of said flange 1. When the cam shoulders 16 thus pass through the opening, the adjoining neck portions 15 are received in the ends of the shorter slot 4 which permits the compressed body of the fastener to expand and seat the base portions 14 in positive bearing engagement with the forward side of the panel or flange 1 adjacent said opening therein. The arrangement otherwise is such that the fastener does not expand to its full size in attached position in the opening 2 but rather, remains in a somewhat compressed tensioned condition urging the base portions 14 outwardly at all times. In this relation, the cam shoulders 16 are in engagement with the projections or abutments 5 in the opening at the rearward side of the flange and cooperate with said base portions 14 in engagement with the opposite, forward side of the flange. Thus the base portions 14 and the cam shoulders 16 cooperate in engagement with opposite sides of the flange 1 bordering the opening 2 therein to secure the fastener firmly and rigidly in attached position against displacement or removal from the opening in either direction such that there is no looseness in the final attachment of the fastener and squeaks, rattling and other objectionable noises in the completed assembly are prevented. In addition, the engagement of the neck portions 15 in the ends of the shorter slot 4 lock the fastener against relative rotation in the opening 2 as is necessary when the cooperating stud is in the form of a rotary type of bolt or screw.

In the event that the rearward side of the panel flange 1 is accessible for the attachment of the fastener, the fastener may be applied to the same attached operative position in the opening 2 from the rearward side of said flange simply by compressing the fastener body as necessary to insert and pass the base portions 14 through the shorter slot 4 to seat said base portions 14 at the forward side of the panel flange 1, as shown in Fig. 2, whereupon the fastener is permitted to expand to seat the cam shoulders 16 in engagement with the rearward marginal projections 5 in the opening at the rearward side of the panel in cooperation with said base portions 14. Likewise, in the event that the rearward side of the panel 1 is accessible for attachment of the fastener in this manner, the fastener receiving opening 2 may be provided in the form of a simple rectangular slot comprising only the shorter slot 4, whereupon the fastener may be attached in the same general manner just described.

The fastener is preferably made with the cam shoulders 16 which are adapted to compensate for manufacturing variations and irregularities in the thickness of the panel adjacent the panel opening and otherwise permit a single size fastener to be provided in a standard design which is adapted for use with panels of various thicknesses, within limits.

On the associated door, closure, or other part B to be secured or connected to the cabinet or other supporting part A, the cooperating stud 20 is provided in the form of a projecting shank designed for snap fastening engagement with the spring arms 11 of the spring catch 10. Such a stud may be constructed for attachment to the flange 7 in any suitable form and in the present embodiment, is shown provided as an inexpensive sheet metal stamping comprising a shank 21 which extends through a slot 8 in said panel flange 7 and includes an angular head portion 22 that seats within the adjacent corner of the part B and is welded thereto as by welding w. The outer free end of the shank comprises a flat bulbous shape in which the edges thereof are designed to provide a blunt leading end and adjacent outwardly diverging guide surfaces 25 merging into inwardly rounded recesses which define curved or rounded shoulders 26 on each edge of the snap stud.

The resilient spring clip 10 and cooperating snap stud 20 are thus attached to the respective panel members A, B, with the flat shank of the stud disposed at right angles to the flat faces of the spring arms 11 of the clip so that said fastening members are thereby arranged to be moved into and out of snap fastening engagement by axial or substantially straight longitudinal movement of the stud. During such inward movement, the diverging guide surfaces 25 of the stud cause the spring arms 11 of the clip to gradually spread apart and permit said stud to pass therebetween and seat the rounded shoulders 26 thereof on the rounded contact surfaces defined by the outwardly bent lips 12 on the spring arms in secured position, substantially as shown in Figs. 4 and 5.

In this relation, the fastening members are actually secured by the rounded contact surfaces defined by the outwardly bent lip elements 12 of the spring arms 11 in engagement with the rounded shoulders 26 on the stud. Thus, the snap stud is adapted to effectively engage the spring arms of the clip in slight angular relationship, if necessary, in what may be termed a limited universal contact. Accordingly, should the stud and clip be somewhat misaligned to cause the stud to move one of the spring arms more than the other, such inaccuracy is readily compensated for by the engagement of the rounded shoulders 26 of the snap stud in universal, close contact with the rounded surfaces defined by the lips 12 on the spring arms. This arrangement together with the foreshortened base construction of the clip providing for the relatively long spring arms 11, prevents undue distortion and strain in the spring arms, and otherwise minimizes danger of fracture of the same by reason of crystallization incidental to continuous wear over an extended period of use. To release the stud and clip from secured position shown in Figs. 4 and 5, axial force providing an axial pull on the stud causes the rounded shoulders 26 on the stud to cam against the rounded contact surfaces on the spring arms as necessary to spread the same apart and thereby permit the stud to be disassociated from the clip and easily and quickly withdrawn therefrom.

Figs. 7–20 inclusive illustrate several modifications in which the spring catch 10 is attached in an opening in a panel, flange or other supporting part A as and for the purposes described, but in which the cooperating stud or strike is provided in the form of simple, inexpensive, one-piece sheet metal stampings having various types of head constructions for attaching the same to the door or other part C to be permanently or separably secured to the supporting part A. The member C is illustrated as a door or other part comprising a panel or plate member 9 having an inturned flange 9' spacing the same from the adjacent surface of the cabinet or other part A in closed or secured position. The panel 9 is readily provided with any type of opening required for accommodating the attaching means of the particular type of head on the stud to be attached thereto for fastening engagement with the spring catch 10 in the same general manner described with reference to Figs. 1–6 inclusive.

In Figs. 7 and 8, the stud 30 is formed in a one-piece sheet metal stamping comprising an enlarged head portion which defines abutments 31 at one end and which is slotted at its opposite end to provide a pair of ears 32 bent outwardly in opposite directions on opposite sides of a central tongue 33. The tongue 33 is provided with serrations 34 on its edges for threadedly engaging the threaded bore in a suitable knob 35 or for otherwise anchoring the same in a socket opening in a similar handle, or the like. In the attached position of the stud 30 on the panel 9, the ears 32 bear upon the inner surface of said panel and the central tongue 33 extends through a suitable opening 36 therein in projecting relation to the outer side thereof. The knob 35 is threaded or otherwise connected to the projecting end of said tongue 33 and cooperates with the ears 32 to retain the stud firmly and rigidly on the panel member C while the abutments 31 on the head of the stud serve as stops which limit the position of said panel member C in closed or secured relation to part A.

Figs. 9 and 10 show a similar construction for a stud 30a in which the central tongue 37 is provided with transverse slots defining shoulders 38 spaced from the ears 32 a distance equal to or slightly less than the thickness of the panel flange 9. In attached position, the tongue 37 extends through the slot 36 in the panel 9 and is twisted as necessary to dispose the shoulders 38 in abutting engagement with the adjacent outer portions of the panel to cooperate with the ears 32 in retaining the stud firmly and rigidly in attached position.

Figs. 11, 12 and 13 show another similar construction for a stud 30b in which the central portion of the head is slotted to provide a pair of spaced tongues which are adapted to be distorted to anchor the stud in attached position. As shown in Fig. 12, in the attached position of the stud, the said tongues 39 extend through a suitable opening 36 in the panel 9 and are spread apart by a suitable wedging tool such as shown at T in Fig. 11, which is forced into the space between said tongues 39 to cause the same to spread apart in sidewise relation as shown in Fig. 12, and also in edgewise relation as illustrated in Fig. 13, in a manner whereby said spaced tongues 39 anchor the stud in attached position in the panel opening 36 and cooperate with the ears 32 to retain the stud firmly and rigidly in such attached position.

Figs. 14 and 15 disclose another form of stud 40 comprising a head portion 41 bent at right angles thereto and provided with outwardly bent corner prongs 42 and inwardly extending thread engaging means 43 struck and formed therefrom. Such thread engaging means 43 may be provided in any suitable form in the manner of cooperating tongues, as shown, or in any similar or equivalent nut construction for threadedly engaging a bolt or screw. A knob or other handle 45 having a threaded shank 46 received in a suitable opening 47 in panel C, is rotated in threaded engagement with the thread engaging tongues 43, or the like, to tighten the head portion 41 of the stud against the panel C with the prongs 42 biting into said panel to anchor the stud against shifting or displacement. When added strength and rigidity in the stud is necessary or desirable, the shank thereof is stamped with a longitudinal rib or corrugation 48 which stiffens and rigidifies the shank against bending forces which might tend to distort or deform the same. Likewise, the sheet metal stud shown in any form of the invention may be stiffened and rigidified by means of a similar rib or corrugation, or the like.

Figs. 16-20 inclusive illustrate a similar stud 50 having a head portion 51 bent at right angles thereto but provided with clip elements for attaching the stud in an opening in the panel C in the manner of a rotary type clip fastener. The stud 50 includes a head 51 extending at right angles to the shank and provided with a pair of outwardly projecting V-shaped hooks 52 and a cooperating locking detent 54 struck and formed therefrom. The hooks 52 preferably are bent to define outwardly flared lips 53 on their leading ends merging into adjacent cam surfaces spaced from the adjacent face of the head 51 a distance slightly less than the thickness of the panel C adjacent the fastener attaching opening 55 therein. This opening is provided as a simple rectangular slot 55 and the V-shaped hooks 52 designed to be received in said slot, as shown in Fig. 17, in the initial step for attaching the stud. In this relation, the hooks 52 extend through the slot with the outwardly flared lips 53 on the leading ends thereof slightly clearing the marginal portions of the slot on the side opposite that on which the head 51 is disposed. When the head of the fastener is rotated ninety degrees to the position shown in Fig. 18, the lips 53 guide the cam hooks 52 into positive bearing engagement with the adjacent marginal portions of the slot as shown in Figs. 19 and 20 such that said hooks cooperate with the head 51 in engaging opposite sides of panel C to retain the stud firmly and rigidly in attached position on said panel. Preferably the locking detent 54 is provided and is so arranged as to snap into and engage a marginal edge of the slot 55 to lock the cam hooks 52 in final position against reverse rotation in the direction for removal from attached relation in said slot as shown in Figs. 18, 19, and 20.

The spring clip device 10 and the cooperating snap studs, in any form, preferably are constructed of relatively thin sheet metal, the thickness of which is selected according to service requirements and the predetermined size of the parts secured. These fasteners are most effective when provided of spring metal suitably spring tempered and otherwise treated to give the desired toughness and hardness, particularly in the case of devices which are subject to heavy dusty and constant usage. Cheap but effective fasteners may be provided from cold rolled metal, such as cold rolled steel, which is untempered but of a spring metal nature and capable of providing an effective and reliable fastening means adapted for a long period of satisfactory service and use.

While the invention has been described in detail with specific examples, such examples are intended as illustrations only inasmuch as it will be apparent that other modifications in the construction, arrangement and general combination of parts may be devised without departing from the spirit and scope of the invention.

What is claimed is:

An assembly comprising a spring catch and a part having an opening in which said spring catch is attached by application entirely from the forward side of said part in position for engaging a cooperating stud, said opening being formed by a pair of intersecting slots comprising a longer slot crossed by a shorter slot and providing marginal projections which define abutments adjacent said opening at the rearward side of said part, and said spring catch comprising a piece of sheet metal bent to form a bowed body providing a pair of spaced body portions applied through said longer slot from the forward side of said part to project from the rearward side of said part in compressed relation in said opening, stud engaging means carried by said body portions comprising spring elements having free ends extending toward the bight of said bowed body, shoulders on said body portions engaging said abutments adjacent said opening at the rearward side of said part, neck portions adjoining said body portions received in the ends of said shorter slot, and base portions extending from said neck portions engaging the forward side of said part in cooperation with said shoulders on the body portions, said shoulders on the body portions comprising diverging cam surfaces adapted to seat on parts of different thicknesses and to compensate for manufacturing variations and irregularities in the thickness of a part adjacent the opening therein.

GEORGE A. TINNERMAN.

References Cited in the file of this patent

UNITED STATES PATENTS

| Number | Name | Date |
|---|---|---|
| 973,001 | Churchill | Oct. 18, 1910 |
| 987,021 | Skowronski | Mar. 14, 1911 |
| 1,531,321 | Vance | Mar. 31, 1925 |
| 1,626,810 | Gingras et al. | May 3, 1927 |
| 2,151,284 | Tinnerman | Mar. 21, 1939 |
| 2,312,991 | O'Connor | Mar. 2, 1943 |
| 2,342,831 | Borchers | Feb. 29, 1944 |
| 2,342,832 | Borchers | Feb. 29, 1944 |